April 2, 1946.   M. MADSEN ET AL   2,397,613
POWER MEANS FOR ROAD PUGS
Filed March 22, 1944   2 Sheets-Sheet 1

INVENTORS
MARTIN MADSEN
WALTER M. MADSEN
BY
ATTORNEY

April 2, 1946.　　M. MADSEN ET AL　　2,397,613
POWER MEANS FOR ROAD PUGS
Filed March 22, 1944　　2 Sheets-Sheet 2
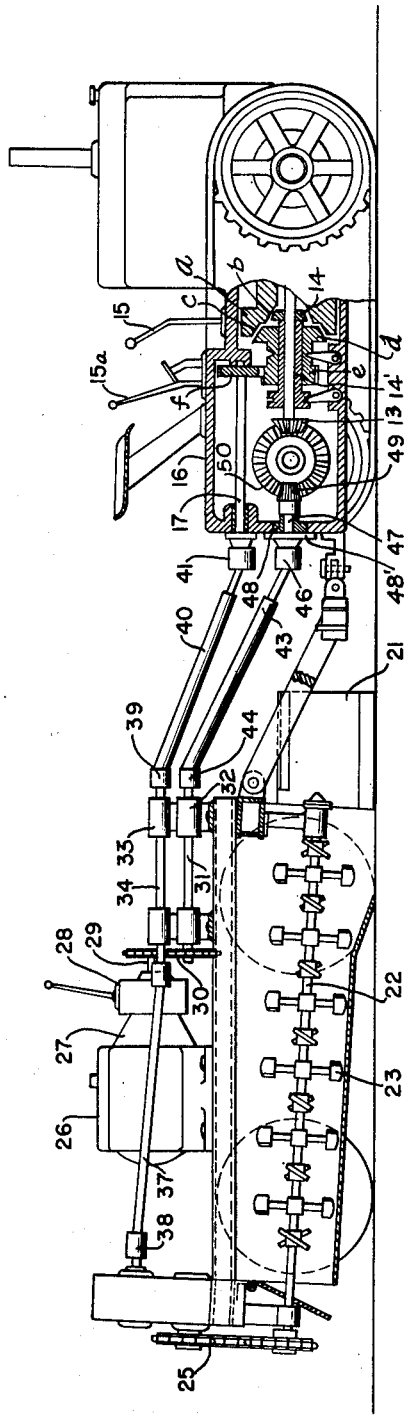
Fig. 2
INVENTORS
MARTIN MADSEN
WALTER M. MADSEN
BY 
ATTORNEY Patented Apr. 2, 1946

2,397,613

UNITED STATES PATENT OFFICE 2,397,613

POWER MEANS FOR ROAD PUGS

Martin Madsen and Walter M. Madsen,
Alhambra, Calif.

Application March 22, 1944, Serial No. 527,652

13 Claims. (Cl. 180—14)

Our invention relates to road making equipment which includes a mixer arranged to pick up road surfacing materials as it is moved along, and to mix these materials with a suitable binder, for example—asphalt—and continuously discharge the road surfacing mixture onto the ground surface so that it may be thereafter spread and rolled, and relates in particular to road surfacing equipment including a mixing device of the character described which may be used with a tractor having sufficient power to drive the mechanism of the mixer, but being incapable of suitably driving both the tractor and the mixing equipment.

In the use of equipment of this character the tractor pulls the mixing device, commonly referred to as a road pug, at relatively slow speed. The power required to move the tractor and the road pug along the ground surface at this slow speed is not relatively large, but the power required to operate the mixing paddles of the road pug is ordinarily three or four times the power required to propel the vehicles at operating speed. It is sometimes found that a tractor selected for use with the road pug does not have sufficient power to drive both the tractor and the road pug without laboring of the tractor engine, that is to say—without operating the tractor engine extremely close to its maximum limit. Also, when extreme conditions of operation are encountered, due to the character of the material being mixed, power beyond the capacity of the tractor's engine may be required. An object of the present invention is to provide a simple arrangement in road making equipment of the character described whereby additional power is supplied for the operation of the unit so that laboring of the tractor engine is avoided and maintenance of full operating speed of travel at all times is assured.

It is a further object of the invention to provide a road making unit comprising a tractor and a mixing device pulled by the tractor wherein the tractor engine is employed for driving the mechanism of the mixer and the mixer has thereon a separate relatively small engine which is connected to the drive of the tractor so that its power is utilized through the drive of the tractor to propel the tractor so that the tractor in turn will pull the mixing device along the path of travel of the unit.

A further object of the invention is to provide a mixing device for road materials adapted to be attached to a tractor, this mixing device having means for connection with a tractor engine for driving the mechanism of the mixing device, and having thereon a supplementary engine and means for connecting this supplementary engine to the propelling mechanism of the tractor to propel the tractor along the ground.

A further object of the invention is to provide a mixing unit of the character described in the preceding paragraph having means for connecting the supplementary engine which is mounted thereon to the gear mechanism of the tractor and to provide an adaptor whereby this connection may be made, thereby making possible the use of standard tractors in the practice of our invention. It will be appreciated that when the tractor is not being used in conjunction with the mixing device, it may be employed for its usual function.

A further object of the invention is to provide a simple means whereby a standard tractor may be driven at a speed lower than the normal low speed of operation obtainable through the low speed gear of the tractor transmission, and also to make it possible to drive the tractor and the mixing mechanism independently and to be able to change the speed of operation of either the tractor or the mixing device to suit existing conditions, without the necessity of varying the speed of the other. In the use of our invention traveling speed control independent of the mixing speed control is obtainable to suit the operational problems encountered. Obviously, if a single engine is employed to drive both the tractor and the mixing device, an excessive load in the mixer absorbs excess power from the tractor engine and influences traveling speed. Inversely, excessive pulling loads caused by a steep incline consume power and diminish available power for the mixer, this resulting in a reduction in engine speed to the point where insufficient horse power to carry on the operations properly is developed.

Further objects and advantages of the invention will be brought out in the following part of the specification.

Referring to the drawings, which are for illustrative purposes only,

Fig. 2 is a sectional view taken as indicated by the line 2—2 of Fig. 1.

Figure 1:
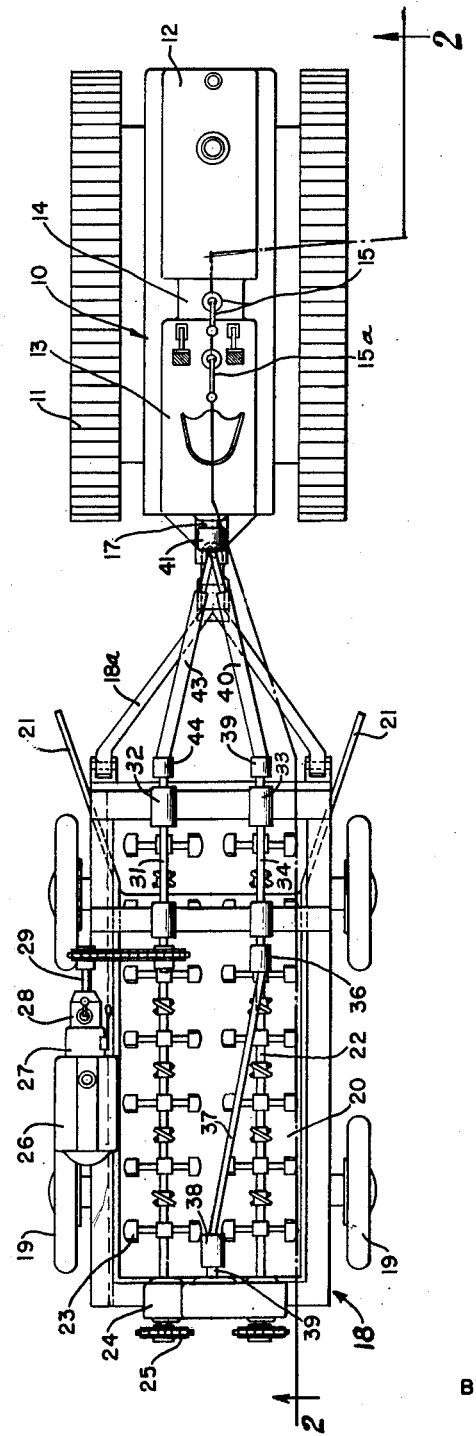
Fig. 1 is a plan view, schematic in character, showing a preferred embodiment of our invention.

In the drawings we show a tractor 10 which may be referred to as a motivating vehicle, since it is adapted to move objects which are connected thereto or engaged thereby. The tractor 10 is of standard construction, having tracks or treads 11 which are normally driven by power transmitted from the tractor engine 12 through a transmission 13 having a clutch 14 which may be disengaged by use of a suitable lever 15 so that the engine may be disconnected from the shafts, gears, etc., through which the power is normally transmitted to the tracks 11.

The tractor 10 has projecting rearwardly from its gear case 16 a power take-off 17 which may be driven directly from the engine 12 when the clutch $d$ is engaged with the transmission 13 in neutral and hence not transmitting power to the tracks 11. That is to say, the power take-off 17 may be, in the manner usual in standard tractors, driven from the engine 12 through the clutch $d$, under control of the lever 15a whenever the gear transmission is placed in neutral by suitable adjustment of the lever 15 and the tracks 11 are therefore not driven. When this lever is shifted out of neutral in the usual manner, the power take-off 17 is de-actuated and the engine supplies power through the clutch and transmission to the tracks 11. This power take-off, so arranged, makes possible the driving of other devices or mechanisms when the tractor 10 is stationary, or when it is moved by the engine 26. Power take-off mechanisms for tractors are well known. In Fig. 2 we have diagrammatically shown the elements of the old power take-off disclosed in Patent No. 1,993,405, granted March 5, 1935 to D. C. Heitshu. Therein, the engine-driven fly wheel $a$ has inner and outer clutch faces $b$ and $c$. The inner clutch 14 is carried by a sleeve 14' which is splined on the drive shaft of the mechanism 13. By suitable movement of the lever 15, the sleeve 14' may be moved axially so as to engage and disengage the small clutch 14. A larger clutch member $d$ is rotatable and slidable on the sleeve 14' and carries a gear $e$ for driving a gear $f$ which is fixed on the power take-off shaft 17. The clutch member $d$ is engaged and disengaged by operation of the lever 15a. It will be recognized that from the engine, either the drive mechanism 13 or the power take-off shaft 17 may be independently or simultaneously driven as a result of selective actuation of the clutch members 14 and $d$.

The invention comprises a second vehicle 18 having wheels 19 so that it may be pulled along the ground by the customary type of draft bar 18a. This second vehicle 18 is referred to as a mixing device and consists of a road pug or pug mill designed to pick up aggregate materials from the ground surface or from a road bed and mix the same with a suitable binder, such as asphalt or heavy oil, returning the mixture to the ground surface or road bed in condition to be spread out and rolled down to a suitable surface. These pug mills are employed not only for the making of asphalt roadways, but also for the asphalt surfacing of large areas such as aircraft landing fields. The road pug has a mixing chamber 20 into which aggregate materials are guided from the road surface by mold boards or gathering blades 21, and within the chamber there are shafts 22 carrying mixing paddles 23 forming a part of a drivable mechanism which includes a reduction gear 24 and transmission chains 25 for transmitting rotation from the reduction gear 24 to the shafts 22.

Mounted on the second vehicle 18 there is a relatively small motor 26 which may consist of an internal combustion engine which, through a clutch 27 and a variable or selective gear transmission 28, drives a shaft 29. Through transmission means 30, shown as a sprocket and chain connection, a shaft 31 is driven. The shaft 31 is mounted in bearings 32 to one side of the longitudinal center line of the mixing device. By means of similar bearings 33, a longitudinal shaft 34 is mounted on the opposite side of the center line of the mixing device, the rearward end of this shaft 34 being connected through a flexible coupling 36, shaft 37, and flexible coupling 38 with the power input shaft 39 of the reduction gear 24. The forward end of the shaft 34 is connected through a flexible coupling 39, shaft 40, and flexible coupling 41 with the power take-off 17 of the tractor 10. The shaft 40 is a telescoping shaft so as to be variable in length, and comprises one part sliding within another. Through this shaft 40 the engine 12 of the tractor 10 may drive the operative mechanism of the mixing device 18 when the tractor 10 is moving or when it is stationary, since the power take-off 17 has direct connection with the engine 12 through the power take-off clutch $d$.

A telescoping shaft 43 is connected by means of a flexible coupling 44 with the forward end of the shaft 31 which is drivable by the motor 26. As shown in Fig. 2, the forward end of the shaft 43 carries a flexible coupling 46 which is attached to the shaft 47 by means for transmitting power to the propelling mechanism of the tractor so that the motor 26 may deliver its power to the ground engaging members or tracks 11 of the tractor 10. The shaft 47 is supported by a bearing 48 forming a part of an adaptor 48' which comprises a plate adapted to be bolted on to the gear case 16 of the tractor in such position that a bevel pinion 49 will engage the ring gear 50 of the track drive mechanism, which ring gear 50 is a normal part of the differential disposed between the drive axles of the tractor. When the transmission 13 of the tractor is in neutral as a result of disengagement of the clutch 14, the tractor is driven by power received from the motor 26 independently of any power produced by the engine 12 of the tractor.

An important advantage of the invention will be perceived from the following explanation of its use. Assuming that the mixing device 18 is of such size that a maximum of ninety horse power is required to drive the mixing paddles 23 when hard conditions of operation are encountered, that the tractor 10, which is of such size that its tracks are fully capable of pulling the pug mill or mixing device 18 along, and that the physical dimensions of the tractor 10 are such as to form a balanced unit with the mixing device 18, it may be found that the power of the engine 12 of such tractor is around 100 horse power, which is insufficient to drive the mechanism of the mixing device 18 and at the same time propel the tractor 10 and the device 18 along the desired path of travel, for the reason that the power required for propelling the working unit, consisting of the tractor and the mixing device, at the slow speed of operation normally employed may be from twenty to twenty-five horse power, with the result that the total power required under maximum conditions of operation is greater than the maximum horse power of the engine 12. The motor 26, consisting of a gasoline engine, will under such conditions have a maximum horse power output of thirty brake horse power, so that it is capable of providing ample power for propelling the road making unit. At the same time the engine 12 of the tractor has ample horsepower capacity to drive the mechanism of the mixing device 18. In our invention, therefore, the supplementary motor 26 is employed for transmitting power to the tracks 11 of the tractor 10 and readily attachable and detachable means are provided for carrying the power from the motor 26 to the gear mechanism of the tractor 10, through which power may be transmitted to the tracks 11. The forward travel of the tractor is controlled by the operator of the mixing device who rides thereon, through suitable operation of the clutch 27 and the selective speed transmission 28 disposed on the mixing device 18 and through which the power of the motor 26 is transmitted to the tracks 11 of the tractor 10. When employing our invention, one desiring use of a mixing device of pug mill type is not called upon to purchase a large and expensive self-propelled mixing unit or even a large tractor, as is necessary when the mixing device is both driven and propelled by the tractor engine, but, as hereinbefore indicated, may use the present invention with a comparatively small tractor of general utility and which may be easily detached from the mixing device and used for general work.

Furthermore, our invention makes possible the driving of the tractor tread so as to produce a forward travel of the tractor and the mixing unit at a low speed of five to forty feet per minute, without any reduction in speed of the mixing paddles.

We claim as our invention:

1. In road making equipment for use with a motivating vehicle having power means and having means for moving the vehicle along the ground, the combination of: a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and means extending from said motor on said mixing device to said motivating vehicle to transmit driving power from said motor to said means for moving the vehicle; whereby said power means of said vehicle will drive said mechanism of said mixing device, and said motor on said mixing device, acting through said means for moving the vehicle along the ground, will propel both the vehicle and the mixing device connected thereto.

2. In road making equipment for use with a motivating vehicle having power means and having means for moving the vehicle along the ground, the combination of: a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and a variable speed transmission connecting said motor on said mixing device to said motivating vehicle to transmit driving power from said motor to said means for moving the vehicle; whereby said power means of said vehicle will drive said mechanism of said mixing device, and said motor on said mixing device, acting through said means for moving the vehicle along the ground, will propel both the vehicle and the mixing device connected thereto.

3. In road making equipment for use with a motivating vehicle, having propelling means including parts to engage the ground, power means, and means for disconnectibly connecting said power means to said propelling means, the combination of: a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and means extending from said motor on said mixing device to said motivating vehicle to transmit driving power from said motor to said means for moving the vehicle; whereby said power means of said vehicle will act when said vehicle power means is disconnected from said propelling means, to drive said mechanism of said mixing device, and said motor on said mixing device, acting through said means for moving the vehicle along the ground, will propel both the vehicle and the mixing device connected thereto.

4. In road making equipment for use with a motivating vehicle, having propelling means including parts to engage the ground, power means, and means for disconnectibly connecting said power means to said propelling means, the combination of: a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and a variable speed transmission connecting said motor on said mixing device to said motivating vehicle to transmit driving power from said motor to said means for moving the vehicle; whereby said power means of said vehicle will act when said vehicle power means are disconnected from said propelling means, to drive said mechanism of said mixing device, and said motor on said mixing device, acting through said means for moving the vehicle along the ground, will propel both the vehicle and the mixing device connected thereto.

5. In road making equipment for use with a motivating vehicle having power means and having means for moving the vehicle along the ground, the combination of: a mixing device adapted to be connected to the vehicle so as to be moved thereby, said mixing device having a drivable mechanism comprising mixing means; a motor on said mixing device; power transmission means extending from said vehicle to said mixing device to transmit power from said power means to said drivable mechanism to operate the same; and power transmission means extending from said motor on said mixing device to said motivating vehicle to transmit driving power from said motor to said means for the vehicle.

6. In road making equipment for use with a motivating vehicle, having propelling means including parts to engage the ground, power means, and means for disconnectibly connecting said power means to said propelling means, the combination of: a mixing device adapted to be connected to the vehicle so as to be moved thereby, said mixing device having a drivable mechanism comprising mixing means; a motor on said mixing device; power transmission means extending from said vehicle to said mixing device to transmit power from said power means to said drivable mechanism to operate the same; and a variable speed transmission connecting said motor on said mixing device to said motivating vehicle to transmit driving power from said motor to said means for moving the vehicle.

7. In road making equipment, the combination of: a motivating vehicle having power means and having means for moving the vehicle along the ground; a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and means extending from said motor on said mixing device to said motivating vehicle to transmit driving power from said motor to said means for moving the vehicle; whereby said power means of said vehicle will drive said mechanism of said mixing device, and said motor on said mixing device, acting through said means for moving the vehicle along the ground, will propel both the vehicle and the mixing device connected thereto.

8. In road making equipment, the combination of: a motivating vehicle having power means and having means for moving the vehicle along the ground; a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and a variable speed transmission connecting said motor on said mixing device to said motivating vehicle to transmit driving power from said motor to said means for moving the vehicle; whereby said power means of said vehicle will drive said mechanism of said mixing device, and said motor on said mixing device, acting through said means for moving the vehicle along the ground, will propel both the vehicle and the mixing device connected thereto.

9. In road making equipment, the combination of: a motivating vehicle having propelling means including parts to engage the ground, power means, and means for disconnectibly connecting said power means to said propelling means; a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and means extending from said motor on said mixing device to said motivating vehicle to transmit driving power from said motor to said means for moving the vehicle, whereby said power means of said vehicle will act when said vehicle power means are disconnected from said propelling means, to drive said mechanism of said mixing device, and said motor on said mixing device, acting through said means for moving the vehicle along the ground, will propel both the vehicle and the mixing device connected thereto.

10. In road making equipment, the combination of: a motivating vehicle, having propelling means including parts to engage the ground, power means, and means for disconnectibly connecting said power means to said propelling means; a mixing device adapted to be connected to the vehicle so as to be moved thereby, said mixing device having a drivable mechanism comprising mixing means; a motor on said mixing device; means extending from said vehicle to said mixing device to transmit power from said power means to said drivable mechanism to operate the same; and a variable speed transmission connecting said motor on said mixing device to said motivating vehicle to transmit driving power from said motor to said means for moving the vehicle; whereby said power means of said vehicle will act when said vehicle power means are disconnected from said propelling means, to drive said mechanism of said mixing device, and said motor on said mixing device, acting through said means for moving the vehicle along the ground, will propel both the vehicle and the mixing device connected thereto.

11. In road making equipment for use with a tractor device having propelling means including ground engaging members, power means drivingly engageable with said propelling means, a power take-off, and means for transmitting power from said power means to said power take-off, the combination of: a vehicle having means for connecting it to the rear end of said tractor device and a mechanism adapted to be operated by power; a motor mounted on said vehicle; means extending from said vehicle to said tractor device for connecting said power take-off of said tractor device to said mechanism to drive the same; and means extending from said motor of said vehicle to said tractor device, having a power transmitting part for connection to said propelling means of said tractor device, whereby the ground engaging members thereof may be operated so as to propel said tractor device and thereby move the vehicle connected thereto.

12. In road making equipment for use with a tractor device having propelling means including ground engaging members, power means drivingly engageable with said propelling means, a power take-off, and means for transmitting power from said power means to said power take-off, the combination of: a vehicle having means for connecting it to the rear end of said tractor device and a mechanism adapted to be operated by power; a motor mounted on said vehicle; means extending from said vehicle to said tractor device for connecting said power take-off of said tractor device to said mechanism to drive the same; means extending from said motor of said vehicle to said tractor device, having a power transmitting part for connection to said propelling means of said tractor device; and an adaptor for connecting said power transmitting part to said propelling means, whereby the ground engaging members thereof may be operated so as to propel said tractor device and thereby move the vehicle connected thereto.

13. In road making equipment for use with a motivating vehicle having power means and having means for moving the vehicle along the ground, the combination of: a second vehicle adapted to be connected to said motivating vehicle said second vehicle having a power drivable mechanism; a motor on said second vehicle; means extending from said motivating vehicle to said second vehicle to transmit power from said power means to said drivable mechanism to operate the same; and means extending from said motor on said second vehicle to transmit driving power to the means for moving said motivating vehicle; whereby said power means of said vehicle will drive said mechanism of said mixing device, and said motor on said mixing device, acting through said means for moving the vehicle along the ground, will propel both the vehicle and the mixing device connected thereto.

MARTIN MADSEN.
WALTER M. MADSEN.